(12) United States Patent
Benco et al.

(10) Patent No.: US 9,574,606 B2
(45) Date of Patent: Feb. 21, 2017

(54) THRUST BEARING FOR HVAC COMPRESSOR

(71) Applicant: Trane International Inc., Piscataway, NJ (US)

(72) Inventors: Michael Gerard Benco, Onalaska, WI (US); Mark W. Harrison, Onalaska, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 149 days.

(21) Appl. No.: 14/454,502

(22) Filed: Aug. 7, 2014

(65) Prior Publication Data

US 2015/0043846 A1 Feb. 12, 2015

Related U.S. Application Data

(60) Provisional application No. 61/863,424, filed on Aug. 7, 2013.

(51) Int. Cl.
*F16C 17/04* (2006.01)
*F16C 33/10* (2006.01)
*F01D 25/16* (2006.01)

(52) U.S. Cl.
CPC ......... *F16C 33/1075* (2013.01); *F16C 17/047* (2013.01); *F16C 33/1045* (2013.01); *F16C 33/1065* (2013.01); *F01D 25/168* (2013.01); *F16C 33/103* (2013.01)

(58) Field of Classification Search
CPC ... F16C 17/047; F16C 33/103; F16C 33/1045; F16C 33/1065; F16C 33/1075; F16C 2360/24; F01D 25/162; F01D 25/168; F01L 2810/02

USPC ............... 384/105, 112, 121, 123, 282, 288, 305,384/368, 420, 425, 428; 417/415; 418/64, 77, 418/94, 65
See application file for complete search history.

(56) References Cited

U.S. PATENT DOCUMENTS

| | | | | | |
|---|---|---|---|---|---|
| 2,362,667 | A | * | 11/1944 | Schmidt | F04D 5/001 269/55 |
| 3,597,027 | A | * | 8/1971 | Herndon | F16C 17/04 384/305 |
| 3,786,289 | A | * | 1/1974 | Baclawski | F16C 17/04 310/90 |
| 4,065,279 | A | * | 12/1977 | McCullough | F01C 1/0215 384/104 |

(Continued)

FOREIGN PATENT DOCUMENTS

GB 829481 A * 3/1960 ............. F16C 17/04

*Primary Examiner* — Marcus Charles
(74) *Attorney, Agent, or Firm* — Hamre, Schumann, Mueller & Larson, P.C.

(57) ABSTRACT

Embodiments of a thrust bearing that may be used with a crankshaft of a HVAC compressor, particularly a HVAC compressor with a vertical or near-vertical placed crankshaft (e.g. a scroll compressor) are provided. The thrust bearing may generally include a bearing header and an insert. The insert may include an insert surface, which is configured to interact with a shaft surface of the crankshaft. The insert surface of the insert may include surface features that may help create flow behavior of the lubricant by a relative motion between the shaft surface of the crankshaft and the insert surface of the insert. The flow behavior of the lubricant may help separate the insert surface of the insert and the shaft surface of the crankshaft by the lubricant in operation to form the bearing, such as a hydrodynamic bearing.

14 Claims, 8 Drawing Sheets

(56) References Cited

U.S. PATENT DOCUMENTS

| | | | | |
|---|---|---|---|---|
| 4,348,065 A * | 9/1982 | Yoshioka | F16C 33/1075 | 384/121 |
| 4,639,148 A * | 1/1987 | Tamura | F01D 25/168 | 384/112 |
| 4,767,293 A * | 8/1988 | Caillat | F01C 1/0215 | 418/55.3 |
| 4,770,547 A * | 9/1988 | New | F16C 9/02 | 384/420 |
| 4,795,220 A * | 1/1989 | Mori | F16C 17/04 | 384/368 |
| 4,824,344 A * | 4/1989 | Kimura | F04C 18/0215 | 384/369 |
| 4,874,302 A * | 10/1989 | Kobayashi | F01C 17/066 | 384/369 |
| 4,886,435 A * | 12/1989 | Sawai | F04C 23/008 | 418/55.3 |
| 5,211,550 A * | 5/1993 | Kawabe | F01C 17/06 | 418/55.1 |
| 5,413,469 A | 5/1995 | Nakajima et al. | | |
| 5,554,015 A * | 9/1996 | Dreiman | F04B 39/0094 | 384/368 |
| 5,725,431 A * | 3/1998 | Reynolds | F16C 21/005 | 384/127 |
| 5,829,338 A * | 11/1998 | Chrestoff | F04B 1/148 | 384/121 |
| 5,951,270 A | 9/1999 | DuMoulin et al. | | |
| 6,024,494 A * | 2/2000 | Buse | F04D 29/0413 | 384/122 |
| 6,419,049 B1 * | 7/2002 | Joo | F16C 17/04 | 184/6.16 |
| 6,460,635 B1 * | 10/2002 | Kalsi | E21B 10/22 | 175/229 |
| 6,537,045 B2 | 3/2003 | Riegger et al. | | |
| 6,637,550 B2 | 10/2003 | Koyama et al. | | |
| 6,827,494 B2 * | 12/2004 | Aguilar | F16C 33/106 | 384/121 |
| 6,976,788 B2 * | 12/2005 | Honda | F16C 17/047 | 384/123 |
| 7,470,064 B2 * | 12/2008 | Link | F01D 25/168 | 384/121 |
| 7,878,777 B2 | 2/2011 | Iwanami et al. | | |
| 8,007,262 B2 | 8/2011 | Ichiyanagi et al. | | |
| 2011/0081264 A1 | 4/2011 | Ishizono et al. | | |
| 2013/0089451 A1 | 4/2013 | Ahn et al. | | |

* cited by examiner

THRUST BEARING FOR HVAC COMPRESSOR

FIELD

The disclosure herein relates to a heating, ventilation, and air-conditioning ("HVAC") system. More specifically, the disclosure herein relates to a thrust bearing, for example a hydrodynamic thrust bearing of, for example, a compressor of the HVAC system.

BACKGROUND

A HVAC compressor may include moving parts, such as a crankshaft, and stationary parts such as housing of the compressor. A bearing may be used between one moving part and one stationary part to reduce, for example, friction and/or wear between the moving part and the stationary part.

SUMMARY

Embodiments as disclosed herein are generally directed to a thrust bearing, such as for example a hydrodynamic thrust bearing, that can be used in a HVAC compressor. The thrust bearing as disclosed herein may be suitable for a compressor with a vertically or near vertically positioned crankshaft, such as for example a scroll compressor, a screw compressor, a reciprocating compressor and other suitable types of compressors, including hermetic compressors. The embodiments as disclosed herein may also be generally positioned between a vertically or near vertically positioned moving part and a stationary part so as to reduce friction, rubbing and/or wear created by the relative motion between the moving part and the stationary part.

In some embodiments, the thrust bearings can be positioned in contact with a bottom end surface of the crankshaft. The bearings can be configured to support the crankshaft and/or withstand a thrust load in the vertical direction or near vertical direction when the compressor is in operation. The embodiments as disclosed herein can help reduce friction, reduce compressor wear and/or increase compressor efficiency.

In some embodiments, the hydrodynamic thrust bearing can include an insert with an insert surface that faces a shaft surface of the crankshaft. In some embodiments, the insert surface may include surface features that help create a hydrodynamic lubricant flow directing the lubricant between the insert surface of the insert and the shaft surface of the crankshaft. The lubricant between the insert surface and the shaft surface can form a lubricant layer that can displace the insert surface away from the shaft surface, so as to reduce friction and/or rubbing between the insert surface and the shaft surface. In some embodiments, the surface features of the insert surface can be configured so that a pressure between the insert surface and the shaft surface is about 250 psi.

In some embodiments, a radial width of the insert surface of the insert may be smaller than a radial width of the shaft surface of the shaft. In some embodiments, a material of the insert may be relatively softer than a material of the crankshaft. In some embodiments, the material of the insert may be a polymer material or a polymer and metal polymer composite material that is softer than crankshaft, for example, porous bronze impregnated with Teflon® or other suitable materials.

In some embodiments, the surface features of the insert surface may include one or more lubricant receiving regions.

The lubricant receiving regions are configured to direct lubricant from a sump of the compressor to the insert surface. In some embodiments, the lubricant receiving regions can include one or more grooves. In some embodiments, the surface features of the insert surface may include one or more flat sections configured to support the crankshaft (e.g. a weight of the crankshaft) and/or withstand the axial thrust load in operation. In some embodiments, a first transitional section may be positioned between one lubricant receiving region and a first neighboring flat section so that lubricant can be directed between the insert surface and the shaft surface through the first transitional section when the crankshaft rotates in a first direction. In some embodiments, a second transitional section may be positioned between the lubricant receiving region and a second neighboring flat section so that lubricant can be directed between the insert surface and the shaft surface through the second transitional section when the crankshaft rotates in a second direction. The second direction may be different from the first direction.

In some embodiments, the first and/or the second transitional sections may be a smooth ramp between the lubricant receiving region and the first and/or the second flat sections.

Other features and aspects of the embodiments will become apparent by consideration of the following detailed description and accompanying drawings.

BRIEF DESCRIPTION OF THE DRAWINGS

Reference is now made to the drawings in which like reference numbers represent corresponding parts throughout.

FIG. 4A is a top view showing surface features of the insert. FIG. 4B is a sectional view of the insert along a line 4B-4B in FIG. 4A.

DETAILED DESCRIPTION

Figure 1:
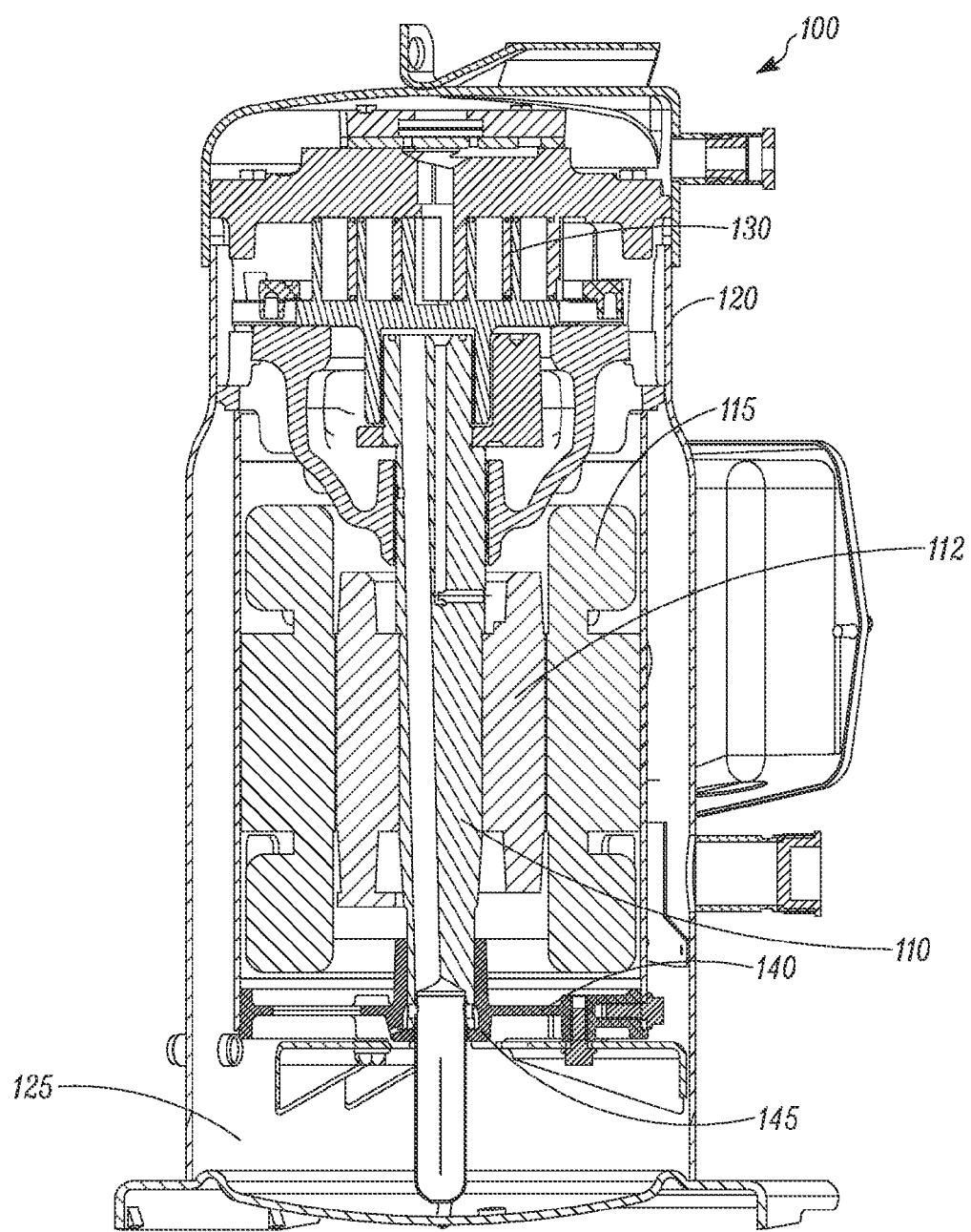
FIG. 1 illustrates a sectional view of a scroll compressor, with which the embodiments as disclosed herein can be practiced.

A compressor of a HVAC system typically includes an orbital crankshaft inside a stationary housing. The crankshaft may be supported by a supporting structure of the housing. A bearing(s) may be used between the orbital crankshaft and the stationary supporting structure of the housing to reduce friction and/or rubbing between the crankshaft and the supporting structure. In operation, the bearing may need to withstand thrust loads created, for example, misalignment between the crankshaft and a stator of the compressor, a weight of the crankshaft, and/or a pressure differential inside the housing improvements are desired to reduce the friction and/or rubbing between the crankshaft and the supporting structure so as to reduce wear on the crankshaft and/or increase the reliability and/or efficiency of the compressor.

Some bearings may require lubrication by a lubricant. The lubricant can separate two surfaces of the bearings that have a relative motion, so that friction and/or wear created by the relative motion can be reduced. The lubricant can be delivered to the bearings, for example, in a fluid static fashion, in which the lubricant can be delivered to the bearing by, for example, a pump. The lubricant can also be delivered to the bearing, for example, in a fluid dynamic fashion, in which the relative motion of the bearing surface can suck the lubricant onto the bearing surfaces.

The embodiments as disclosed herein are directed to a thrust bearing (such as a hydrodynamic thrust bearing) that may be used with a crankshaft of a HVAC compressor, particularly a HVAC compressor with a vertically or near vertically placed crankshaft (e.g. a scroll compressor). The thrust bearing may generally include an insert between a bearing header and a crankshaft surface of the crankshaft. The insert may include an insert surface, which is configured to interact with the crankshaft surface of the crankshaft. The insert surface of the insert may include surface features that may help lubricate the bearing by creating hydrodynamic lubricant flow behavior caused by a relative motion between the shaft surface of the crankshaft and the insert surface of the insert. The hydrodynamic flow behavior may help separate the insert surface of the insert and the shaft surface of the crankshaft by the lubricant in operation via creating a hydrodynamic flow and/or film between the surfaces.

In some embodiments, the surface features of the insert surface of the insert may include one or more lubricant receiving regions that may help direct the lubricant onto the insert surface of the insert. In some embodiments, the surface features may also include one or more flat sections that may support the crankshaft. In some embodiments, the flat sections may be made of a material that is harder than the material of the crankshaft. In some embodiments, the surface features may include one or more ramp regions, each of which is positioned between a lubricant receiving region and a neighboring flat section. The ramp may help direct the lubricant from the lubricant receiving region toward the flat sections so that the lubricant can separate the flat section and the crankshaft.

The embodiments as disclosed herein may help reduce friction between the crankshaft and the insert and/or rubbing between the crankshaft and the insert. The advantages of the embodiments as disclosed herein may include improvements in compressor efficiency and/or compressor reliability.

References are made to the accompanying drawings that form a part hereof, and in which is shown by way of illustration of the embodiments in which the embodiments may be practiced. It is to be understood that the terms used herein are for the purpose of describing the figures and embodiments and should not be regarded as limiting the scope of the present application.

FIG. 1 illustrates a scroll compressor 100 with which the embodiments as disclosed herein may be practiced. It is to be appreciated that the embodiments as disclosed herein may be used with other types of compressors, such as for example other types of scroll compressors, a screw compressor, a reciprocating compressor and other suitable types of compressors, including hermetic compressors. Generally, the embodiments as disclosed herein are suitable for a compressor with a vertical or near vertical crankshaft (such as a crankshaft 110). The embodiments as disclosed herein are also suitable for a device with a vertical or near vertical moving part and a stationary part.

As illustrated, the scroll compressor 100 includes a housing 120. The crankshaft 110 is coupled to a rotor 112. The rotor 112 is surrounded by a stator 115. The crankshaft 110 is coupled to a scroll mechanism 130 that is configured to compress, for example, refrigerant. The housing 120 also includes a lubricant sump 125 that may contain a lubricant.

The crankshaft 110 is positioned vertically or near vertically in the orientation as shown in FIG. 1. In the vertical direction, the crankshaft 110 is supported by a stationary supporting structure 140 of the housing 120. The crankshaft 110 and the supporting structure 140 are separated by a bearing 145.

In operation, the stator 115 and the rotor 112 can create a relative motion, which is transmitted to the crankshaft 110. The crankshaft 110 can then drive the scroll 130 to orbit and compress refrigerant.

The bearings 145 may withstand axial thrust loads in the vertical direction. The axial thrust load may be created by, for example, misalignment between the crankshaft 110 and the stator 115. Further, the axial thrust load may be created by, for example, a weight of the crankshaft 110. The axial thrust load may also be created by, for example, a pressure differential between the scroll mechanism 130 and sump 125 of the housing 120. The axial thrust load may increase friction between the crankshaft 110 and the bearing 145 and consequently cause wear of the bearing 145 and/or the crankshaft 110.

Figure 2:
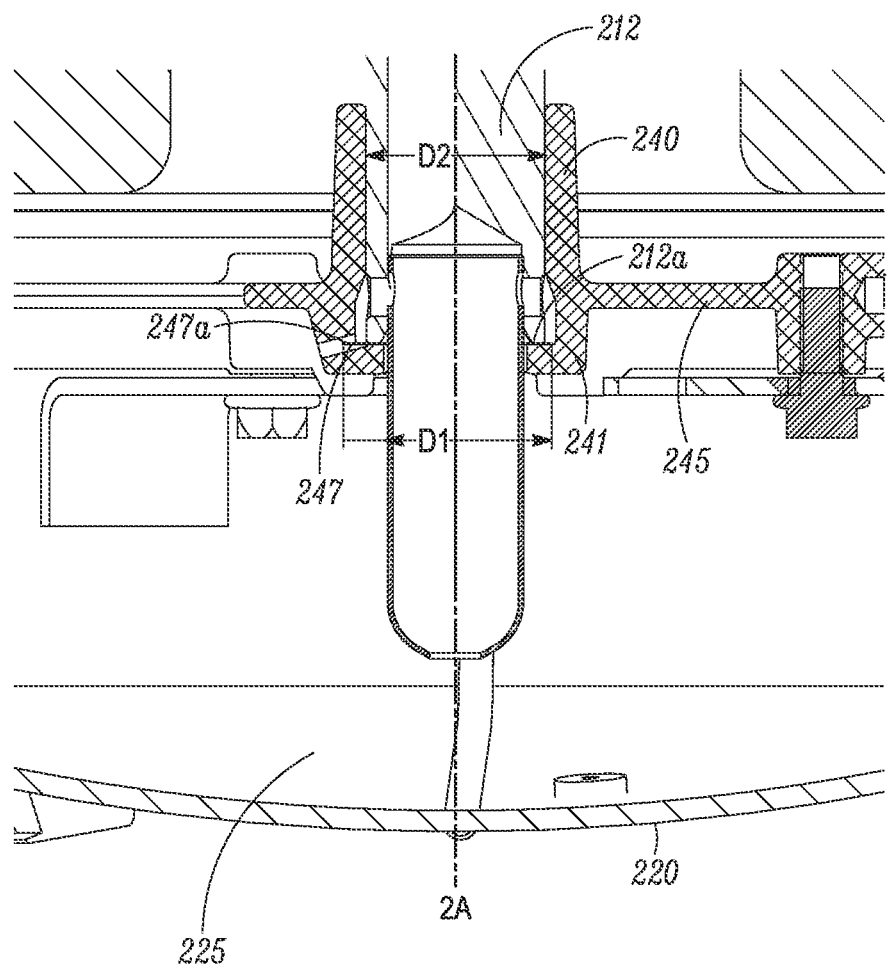
FIG. 2 illustrates a sectional view of a lower end of a compressor, according to one embodiment.

FIG. 2 illustrates an embodiment of a thrust bearing, such as for example a hydrodynamic thrust bearing 240 that can be positioned between a crankshaft 212 and a supporting structure 245 of a housing 220. In the illustrated embodiment, the crankshaft 212 is generally positioned in a vertical direction in the direction as shown in FIG. 2.

The hydrodynamic thrust bearing 240 generally includes a bearing header 241 and an insert 247. The insert 247 is generally positioned between the crankshaft 212 and the bearing header 241.

The crankshaft 212 has a shaft surface 212a, and the insert 247 has an insert surface 247a. The shaft surface 212a, in some embodiments, may be the lower end surface of the crankshaft 212 as shown in FIG. 2. In general, the shaft surface 212a can be a surface that is configured to support the crankshaft 212. In some embodiments, the surface configured to support the crankshaft may be located on a support structure that is located at a middle portion of the crankshaft (e.g. a surface of an intermediate ledge configured to support the crankshaft). (Not shown.) Generally, the shaft surface 212a and the insert surface 247a are configured to face each other and the shaft surface 212a and the insert surface 247a can in some cases be in contact with each other.

The crankshaft 212 has an axial direction 2A. In operation, the rotation of the crankshaft 212 may create a thrust force in the axial direction 2A. The axial thrust load can increase friction between the shaft surface 212a and the insert surface 247a, which may cause wear on the insert 247 and/or the crankshaft 212.

The housing 220 includes a sump 225 that is configured to contain a lubricant. The insert surface 247a of the hydrodynamic thrust bearing 240 may include surface features that help create a hydrodynamic lubricant flow behavior (e.g. create a hydrodynamic lubricant film on the insert surface 247a) to direct lubricant in the sump 225 between the insert surface 247a and the shaft surface 212a of the crankshaft 212. The lubricant can displace, such as by hydrodynamic lift, the insert surface 247a away from the shaft surface 212a, so that the friction between the insert surface 247a and the shaft surface 212a can be reduced.

Compared to a regular bearing that does not have a surface feature configured to create a hydrodynamic lubricant flow behavior in the surface of the insert (such as a bearing that relies on boundary lubrication or a hydrostatic bearing), the hydrodynamic thrust bearing 240 can enhance the delivery of lubricant between the insert surface 247a and the shaft surface 212a of the crankshaft 212, reducing the friction compared to the regular bearing. As a result, the efficiency of the compressor can be increased.

The hydrodynamic thrust bearing 240 may also have reduced parasitic losses compared to a regular bearing (such as a bearing that relies on boundary lubrication). In a regular bearing, the parasitic losses may be due to rubbing of the rotating crankshaft and a bearing insert of the regular bearing, while the parasitic losses in the hydrodynamic thrust bearing 240 may be due to sharing of oil, which is generally smaller than parasite losses due to rubbing.

The hydrodynamic thrust bearing 240 may be also helpful in a HVAC compressor where the viscosity of the lubricant in the HVAC compressor may be relatively low. It may be more difficult for the lubricant to stay on a bearing surface when the viscosity of the lubricant is relatively low. In addition, refrigerant in the HVAC compressor may wash the lubricant off the bearing surface(s). Using the hydrodynamic thrust bearing 240 can help positively direct lubricant to the bearing surface(s). Compared to a regular bearing that relies on boundary lubrication, for example, the hydrodynamic thrust bearing 240 can have more consistent lubrication and sometimes have more lubricant on the bearing surface(s), resulting in an increased compressor capacity/efficiency.

The surface features of the shaft contacting surface 247a of the insert 247 may be optimized to the operation condition of the HVAC compressor, so that the hydrodynamic lubricant flow between the shaft surface 212a and the insert surface 247a is optimized during a normal operation.

The HVAC compressor can be a fixed speed compressor or a variable speed compressor. When the compressor is a fixed speed compressor, for example, the hydrodynamic thrust bearings 240 can be configured to provide a hydrodynamic lubricant flow between the shaft surface 212a and the insert surface 247a that is sufficient to completely displace the shaft surface 212a away from the insert surface 247a in normal operation speed (such as, for example, up to and/or at about 3600 rpm). The hydrodynamic thrust bearing 240 can be very helpful when the crankshaft rotates at a relatively low speed.

When the compressor is a variable speed compressor, for example, the hydrodynamic thrust bearings 240 can be configured to provide a hydrodynamic lubricant flow between the shaft surface 212a and the insert surface 247a that is sufficient to completely displace the shaft surface 212a away from the insert surface 247a at a relatively frequent operation speed or speed range (such as, for example, up to and/or at about 3500 rpm, up to and/or at about 5200 rpm, and up to and/or at about 5400 rpm). Because the hydrodynamic thrust bearing 240 can positively help direct lubricant flow between the shaft surface 212a and the insert surface 247a, the lubrication between the crankshaft 212 and the bearing 240 is relatively better compared to a regular bearing (such as a bearing that relies on boundary lubrication).

In some embodiments, the surface features of the insert surface 247a can be configured so that a pressure between the shaft surface 212a and the insert surface 247a can be up to about 250 psi when the compressor is in a normal operation condition.

In some situations, such as when the crankshaft stops, the lubricant can move away between the shaft surface 212a and the insert surface 247a. When the compressor starts from such a condition, the shaft surface 212a and the insert surface 247a may not have sufficient lubrication (also called a dry start-up condition). In some embodiments, the surface features of the insert surface 247a can be configured so that the pressure between the shaft surface 212a and the insert surface 247a is no more than about 250 psi when the compressor is not in operation. The material of the insert 247 can be configured to minimize wear caused by a dry start-up condition. It is to be noted that the dry start-up condition can also be caused by refrigerant washing the lubricant away from the shaft surface 212a and/or the insert surface 247a.

In some embodiments, the surface features of the insert surface 247a can be configured so that a hydrodynamic lubricant flow can be created on the insert surface 247a when the crankshaft rotates in both directions relative to the axial direction 2A.

In the illustrated embodiment as shown in FIG. 2, a radial width D1 of the insert surface 247a of the insert 247 is larger than a radial width D2 of the shaft surface 212a of the crankshaft 212. Often, a material of the part with the relatively larger radial width may be harder than a material of the part with the relatively smaller radial width when configuring a bearing. Accordingly, the material of the insert 247 (such as a specialized alloy) may be configured to be harder than the material of the crankshaft 212 (such as iron).

Figure 3:
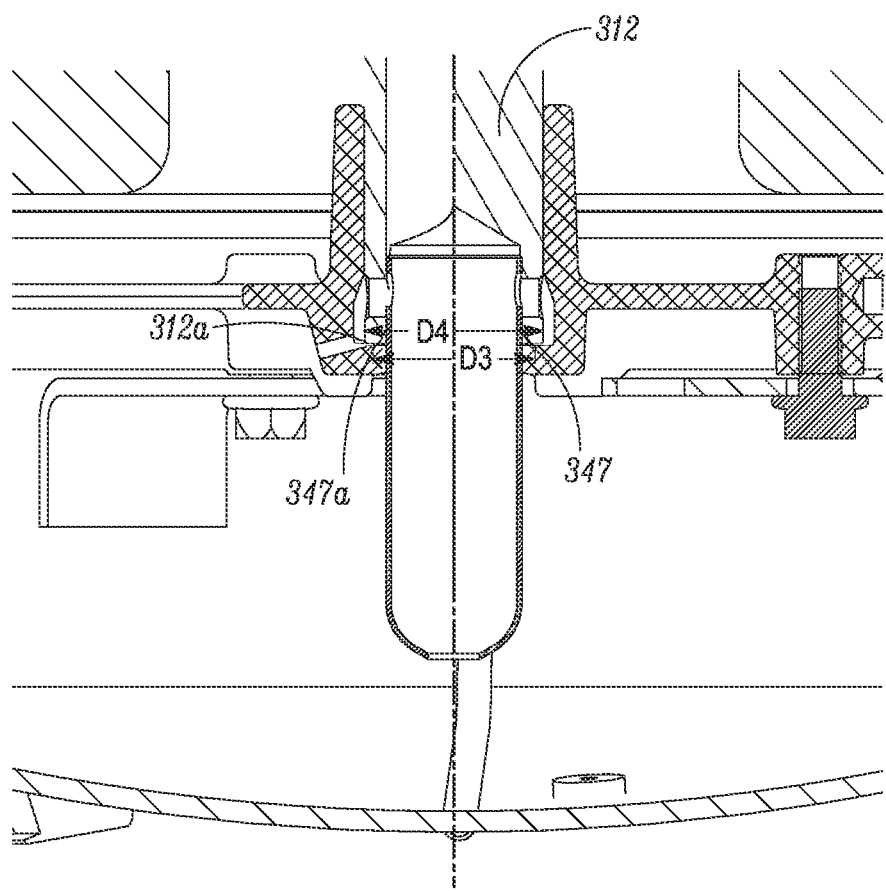
FIG. 3 illustrates a sectional view of a lower end of a compressor, according to another embodiment.

As illustrated in FIG. 3, in another embodiment, a radial width D3 of an insert surface 347a of an insert 347 can be smaller than a radial width D4 of a shaft surface 312a of a crankshaft 312. It is noted that the surface features/configurations as described herein can also be applied to other surfaces that may withstand, for example, axial thrusts. In some embodiments, the surface including the surface features may have a relatively small radius compared to the other surface with which it is in contact, so that the surface features are fully covered by the other surface.

In the illustrated embodiment, the crankshaft 312 overhangs on the insert 347. A material of the insert surface 347a of the insert 347 (such as polymer or metal/polymer composite material, for example, porous bronze impregnated with Teflon or other suitable materials) may be softer than a material of the crankshaft 312 (such as iron). It is to be appreciated that an insert with a diameter that is smaller than a shaft surface 312a of the shaft 312 may be applicable to non-hydrodynamic bearings, such as a bearing that relies on boundary lubrication.

Figure 4A:
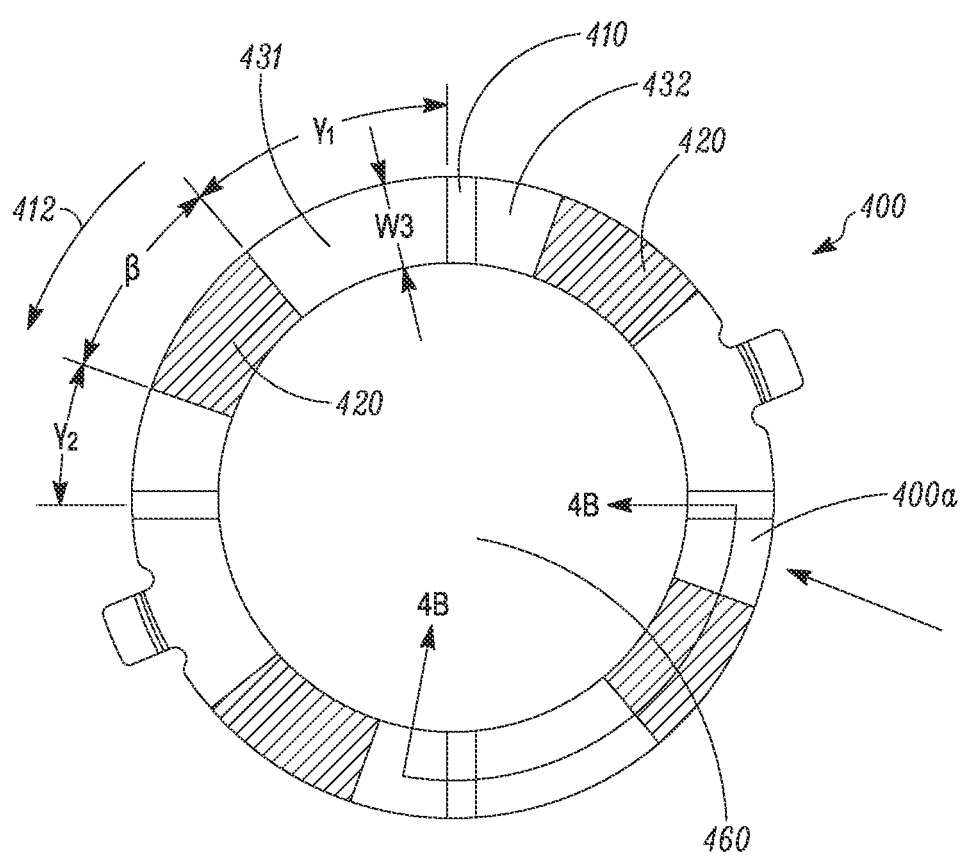
FIGS. 4A and 4B illustrate different views of an insert of a hydrodynamic thrust bearing, according to one embodiment.
Figure 4B:
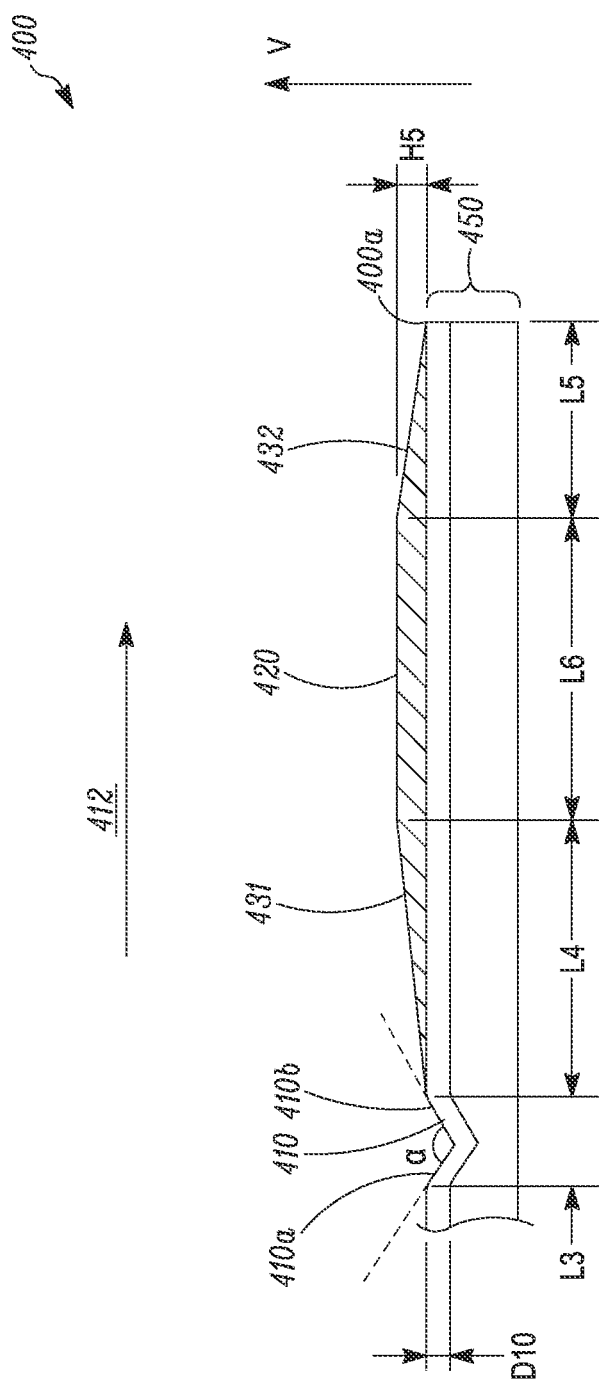

FIGS. 4A and 4B illustrate one embodiment of an insert 400 that may be used in a hydrodynamic thrust bearing (such as the insert 247 of the hydrodynamic thrust bearing 240 in FIG. 2). The insert 400 may generally have a circular profile and a ring like structure.

An insert surface 400a may include one or more features that help create a hydrodynamic fluid flow on the insert surface 400a in operation. The insert surface 400a can include one or more lubricant receiving regions 410. The lubricant receiving regions 140 are generally configured to receive lubricant, for example, from a sump of a compressor. The lubricant receiving regions 410 can be groove like structures. The insert surface 400a can also include one or more flat sections 420. Each of the lubricant receiving regions 410 is separated from the neighboring flat sections 420 by a first transitional section 431 and/or a second transitional section 432.

Relative to a rotation direction 412 of a crankshaft (such as the crankshaft 110 in FIG. 1), the insert surface 400a in some embodiments includes a structural configuration that includes one lubricant receiving region 410, one first transitional section 431, one flat section 420, and one second transitional section 432 respectively. This structural configuration repeats one or more times along the circular profile of the insert 400.

The insert 400 has a center opening 460 that is configured to receive a crankshaft. The ring like structure of the insert 400 has a width W3. In some embodiments, the lubricant receiving region 410, the first and second transitional sections 431 and 432, and the flat section 420 all generally occupy the entire width W3, as illustrated in FIG. 4A. It is noted that in some embodiments, the lubricant receiving region 410, the first and second transitional sections 431 and 432, and/or the flat section 420 do not need to occupy the entire width W3. (See FIG. 6 for example.)

A cross sectional view along a line 4B-4B in FIG. 4A is shown in FIG. 4B. As illustrated in FIG. 4B, the lubricant receiving region 410 has a trench like structure with ramps 410a and 410b on both sides of the lubricant receiving region 410. The trench like structure with ramps 410a and 410b can help direct lubricant from a sump (such as the sump 125 in FIG. 1) to the lubricant receiving region 410 and then direct the lubricant out of the lubricant receiving region 410. In some embodiments, the ramps 410a and 410b has an angle α therebetween, and the angle α may be at or about 157 degrees to at or 163 degrees. The lubricant receiving region 410 has a depth D10. In some embodiments, the depth D10 is at or about 0.002 to at or about 0.017 inch. The lubricant receiving region 410 has a length L3. In some embodiments, the length L3 is at or about 0.089 to at or 0.152 inch. In some embodiments, the length L3 is at or about 0.06 to at or about 0.16 inch.

It is to be appreciated that the lubricant receiving region 410 can have other configurations. For example, in some embodiments, a cross section of the lubricant receiving region 410 may have other suitable cross sections, such as for example a "U" shape with a rounded or radiused bottom.

The flat section 420 is a raised section relative to a base 450 of the insert 400. In some embodiments, a height h5 of the flat section relative to the base 450 may be about 0.001 inch to about 0.005 inch. The flat section 420 may be made of a material that is different from the base 450. In some embodiments, the flat section 420 can be made of a material (such as a silicon containing alloy) that is harder than the material for the crankshaft (such as steel). The flat section 420 is generally the section on the shaft contacting surface 400a that supports the crankshaft and bears the axial thrust load created by the crankshaft in operation.

As illustrated in FIG. 4B, the first transitional section 431 is generally the section between the lubricant receiving region 410 and the flat section 420. In normal operation, the crankshaft rotates in the direction 412 as shown. The lubricant can be collected by the lubricant receiving region 410 and be directed to the flat section 420 through the first transitional section 431. Because the rotation of the crankshaft can help create a hydrodynamic lubricant flow on the surface 400a, lubricant can be directed toward the flat section 420 and displace the crankshaft away from the flat section 420 in a vertical direction V, which is generally perpendicular to the rotation direction 412.

The second transitional section 432 can be positioned next to the flat section 420 opposite to the first transitional section 431. Referring back to FIG. 4A, the second transitional section 432 can help direct lubricant from the lubricant receiving region 410 to the flat section 420 when the crankshaft rotates in a direction opposite to the direction 412.

As illustrated in FIG. 4B, the first transitional section 431 and the second transitional section 432 have a length L4 and L5 respectively in the cross section. The flat section 420 has a length L6. Generally, the length L6 is configured to be as long as possible to increase the contact between the flat section 420 and the crankshaft, so that the pressure between the flat section 420 and the crankshaft can be minimized in operation. Consideration is also given to the length L4 and/or L5 so that the transitional sections 431 or 432 can be long enough to provide a hydrodynamic lubricant flow from the lubricant receiving region 410 to the flat section 420 in a normal operation mode or in a reverse operation mode respectively.

Relative to the rotation direction 412 as shown in FIG. 4B, the first transitional section 431 is shown as a leading ramp where a pressure is generated to create the hydrodynamic flow and the second transitional section 432 is shown as a trailing ramp. Generally, the length L4 of the leading ramp in some embodiments is longer than the length L5 of the trailing ramp.

Referring to FIG. 4A, relative to the circular profile of the insert 400, an arc angle β corresponding to the flat section 420 may be at least about 30 degrees. An arc angle γ1 and/or an arc angle γ2 of the first transitional section 431 and/or the second transitional section 432 can be configured to be at least about 10 degrees. In some embodiments, the arc angle γ1 can be about 40 degrees. In some embodiments, the arc angle γ2 can be about 10 to 15 degrees. Referring to FIG. 4A, the arc angles β, γ1 and γ2 can correspond to length L6, L4 and 432 respectively.

It is to be appreciated that when the shaft contacting surface 400a include a plurality of lubricant receiving regions 410, transitional sections 431 or 432, or the flat sections 420, each of the lubricant receiving regions, transitional sections 431 or 432, or the flat sections 420 can be configured to have different length along the circular profile of the insert 400.

Referring back to FIG. 4B, the first transitional section 431 and/or the second transitional section 432 can be configured to be a smooth transitional ramp between the lubricant receiving region 410 and the flat section 420. From the lubricant receiving region 410 to the flat section 420 as shown in FIG. 2B, the first transitional section 431 is a smooth upward ramp. And the second transitional section 432 is a smooth downward ramp from the flat section 420. It is to be appreciated that the first and/or second transitional sections can be configured other than as a smooth ramp.

Figure 5A:
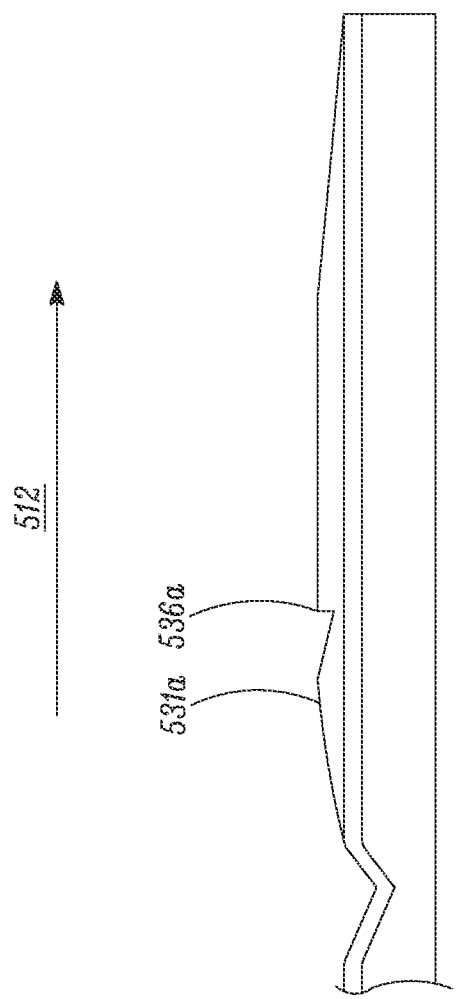
FIGS. 5A and 5B illustrate sectional views of two different embodiments of the insert.
Figure 5B:
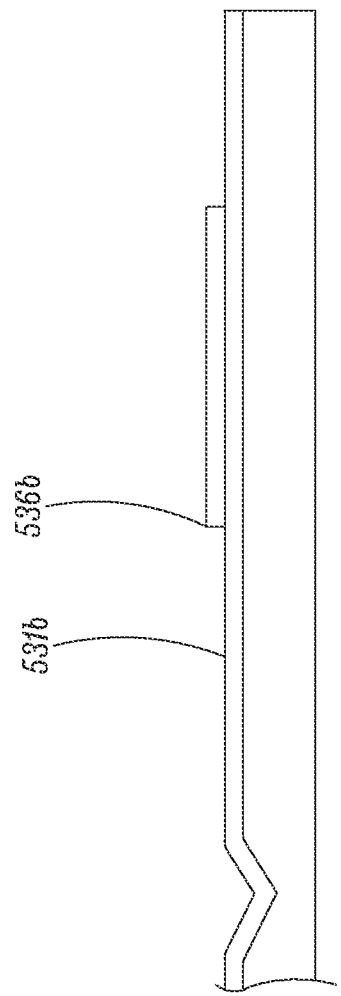

FIGS. 5A and 5B illustrate two exemplary configurations for transitional sections 531a and 531b respectively. As illustrated in FIG. 5A, the transitional section 531a can be a mix of smooth ramp(s) and a step(s) 536a. The step 536a can be positioned at a beginning region, a middle region or an end region of the transitional section 531a along a rotation direction 512.

As illustrated in FIG. 5B, the transitional section 531b may not have a smooth ramp. The transitional section 531b can be a flat surface with one or more steps 536b.

Figure 6:
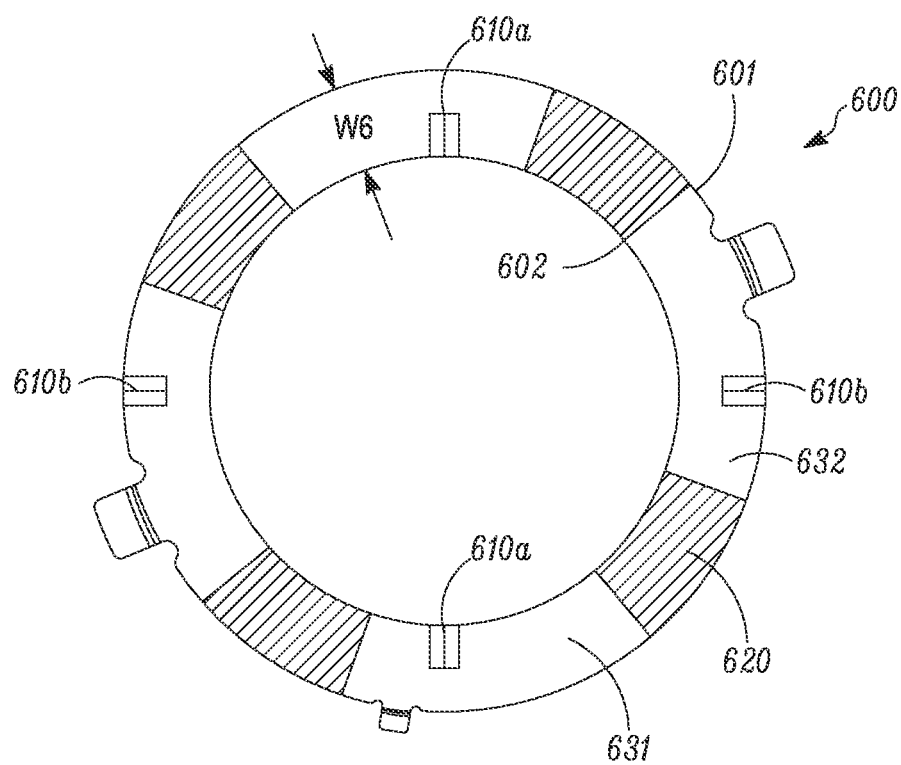
FIG. 6 illustrate a top view of an insert of a hydrodynamic thrust bearing, according to another embodiment.

It is noted that a lubricant receiving region (e.g. the lubricant receiving 410), a first and second transitional sections, (e.g. the first and second transitional sections 431 and 432), and/or a flat section (e.g. the flat region 420) do not need to occupy an entire width of an insert. FIG. 6 illustrates that a lubricant receiving region(s) 610a, 610b may extend partially across a radial width W6 of an insert 600.

It is also to be appreciated that the partially extended lubricant receiving region(s) 610a, 610b can extend from either an outer edge 601 (e.g. in case of 610b) or an inner edge 602 (e.g. in case of 610a) of the insert 600. It is to be appreciated that, likewise, a first and second transitional sections 631, 632, and/or a flat section 620 may extend partially across the width W6 of the insert 600, and may extend from either the inner edge 602 or the outer edge 601 of the insert.

In some embodiments, whether the lubricant receiving region(s) 610a, 610b, extends from the inner edge 602 or the outer edge 601 may depend on the location of the oil source.

In the illustrated embodiment of FIGS. 4A and 6, the lubricant receiving region 410, 610a, 610b are oriented radially. It is to be appreciated that the lubricant receiving region(s) may also extend at an angle relative to the radial direction.

It is to be appreciated that the features and configurations described herein with respect to an insert (e.g. the insert 247 in FIG. 2) may be applied to surfaces of a crankshaft (e.g. the crankshaft 110 in FIG. 1) and/or other structure(s) that is configured to be in contact with the crankshaft to withstand axial thrust (e.g. the bearing header 241 in FIG. 1). In some embodiments, a separate insert may not be needed, when the surface features and configurations described herein are applied to, for example, surfaces of the crankshaft and/or other structure(s) that can support these surface features.

It is to be appreciated that the embodiments as described herein can be generally applied to different types of compressors and pumps, such as for example in an air compressor or in a water pump. With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What is claimed is:

1. An insert for a hydrodynamic thrust bearing, comprising:
   a ring-like body having a crankshaft contacting surface; and
   at least one structural configuration on the crankshaft contacting surface, the structural configuration including a lubricant receiving region, a first transitional region having a sloped ramp with a height increasing from the lubricant receiving region to a flat region, and a second transitional region next to the flat region and having a sloped ramp with a height decreasing from the flat region, sequentially arranged along the crankshaft contacting surface;
   wherein the lubricant receiving region includes a groove configured to receive and direct lubricant when the hydrodynamic thrust bearing is in operation.

2. The insert of claim 1, wherein the groove extends radially across an inner edge and an outer edge of the ring-like body.

3. The insert of claim 1, wherein the groove extends from an inner edge of the ring-like body, and partially across a width of the ring-like body between the inner edge and an outer edge of the ring-like body.

4. The insert of claim 1, wherein the groove extends from an outer edge of the ring-like body, and partially across a width of the ring-like body between the outer edge and an inner edge of the ring-like body.

5. The insert of claim 1, wherein the first transitional region is configured to guide a lubricant flow from the lubricant receiving region toward the flat region.

6. The insert of claim 1, wherein the crankshaft contacting surface includes at least two structural configurations.

7. A compressor, comprising:
   a crankshaft;
   a crankshaft support; and
   a bearing between the crankshaft and the crankshaft support, the bearing including a first bearing surface and a second bearing surface;
   wherein at least one of the first bearing surface and the second bearing surface include at least one structural configuration which includes a lubricant receiving region, a first transitional region having a sloped ramp with a height increasing from the lubricant receiving region to a flat region, and a second transitional region next to the flat region and having a sloped ramp with a height decreasing from the flat region, sequentially arranged along the at least one of the first bearing surface and the second bearing surface; and
   the lubricant receiving region includes a groove configured to receive and direct lubricant when the bearing is in operation.

8. The compressor of claim 7, wherein the groove extends from an inner edge of a ring-like body, and partially across a width of the ring-like body between the inner edge and an outer edge of the ring-like body.

9. The compressor of claim 7, wherein the groove extends from an outer edge of a ring-like body, and partially across a width of the ring-like body between the outer edge and an inner edge of the ring-like body.

10. The compressor of claim 7, wherein the first transitional region is configured to guide a lubricant flow from the lubricant receiving region toward the flat region.

11. The compressor of claim 7, wherein the at least one of the first bearing surface and the second bearing surface includes at least two structural configurations.

12. The compressor of claim 7, wherein the crankshaft is vertically arranged.

13. The compressor of claim 7, wherein the at least one structural configuration is embodied in an insert disposed between the crankshaft and the crankshaft support.

14. A method of providing lubrication in a thrust bearing, comprising:
   directing a lubricant into a lubricant receiving region;
   directing the lubricant along one of a first transitional region having a sloped ramp with a height increasing from the lubricant receiving region to a flat region or a second transitional region having a sloped ramp with a height decreasing from the flat region to the lubricant receiving region, wherein the first transitional region receives the lubricant when rotating in a first direction and the second transitional region receives the lubricant when rotating in a second direction that is different from the first direction; and
   receiving the lubricant at the flat region;
   wherein directing the lubricant along one of the first transitional region or the second transitional region and receiving the lubricant at the flat region are accomplished by a relative motion of two bearing surfaces of the thrust bearing to create a hydrodynamic lubricant flow, and
   the hydrodynamic lubricant flow creates a lubricant layer between the two bearing surfaces.

* * * * *